UNITED STATES PATENT OFFICE.

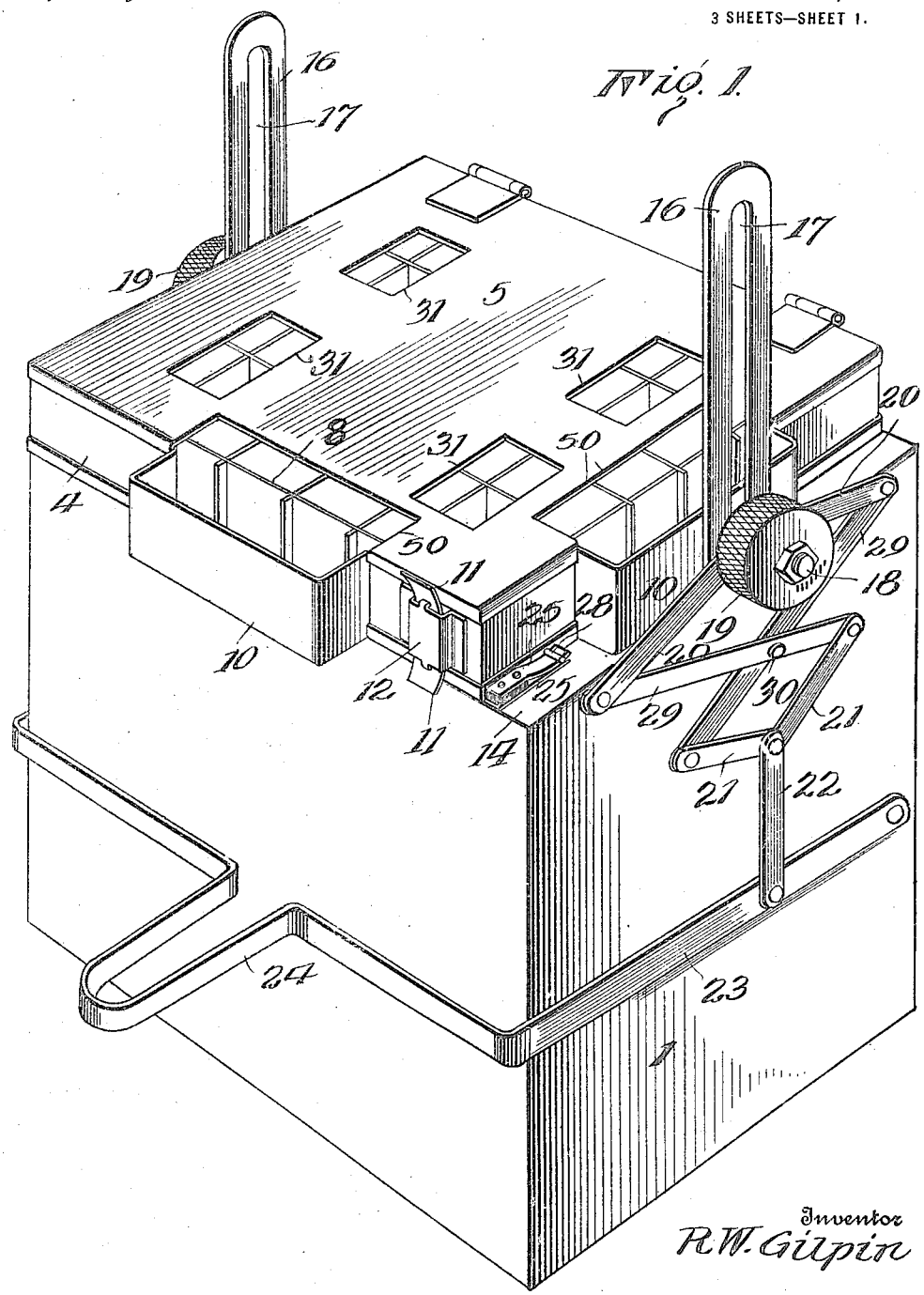

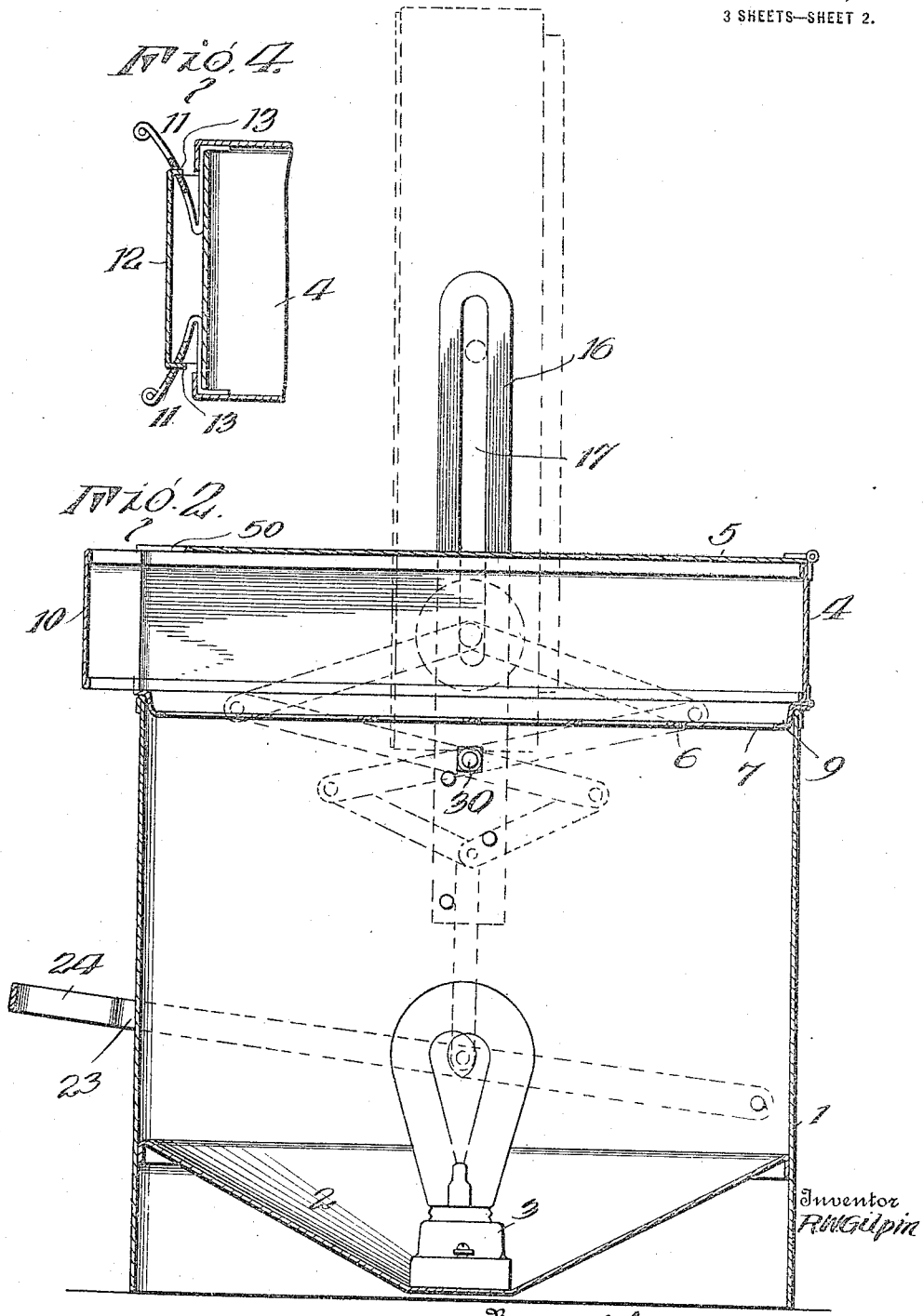

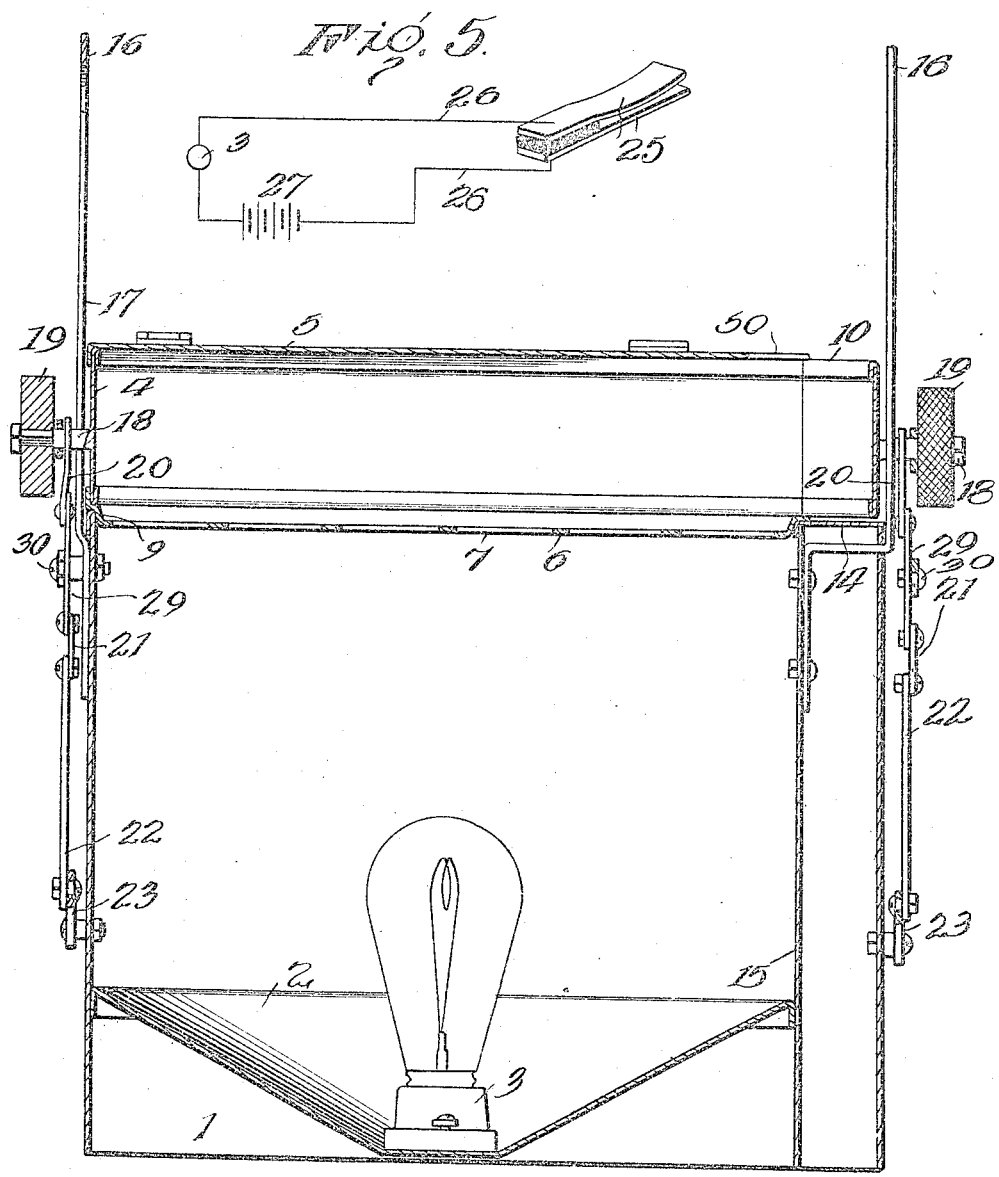

ROBERT W. GILPIN, OF CODELL, KANSAS.

EGG-TESTER.

1,229,936.

Specification of Letters Patent.   Patented June 12, 1917.

Application filed December 19, 1916. Serial No. 137,824.

*To all whom it may concern:*

Be it known that I, ROBERT W. GILPIN, a citizen of the United States, residing at Codell, in the county of Rooks and State of Kansas, have invented certain new and useful Improvements in Egg-Testers, of which the following is a specification.

This invention relates to egg testers and has for its object the provision of simple and efficient means whereby the eggs may be rapidly handled and tested without liability to breakage. The invention seeks to provide simple and efficient mechanism whereby the egg containing member may be quickly arranged to receive a filler and a flat containing the eggs, then placed in the testing position, and then returned to the former position to permit removal of the eggs.
The invention is illustrated in the accompanying drawings in which:

Figure 1 is a perspective view of an egg tester embodying my improvements;

Fig. 2 is a vertical section of the same;
Fig. 3 is a vertical section taken in a plane at a right angle to the plane of Fig. 2;

Fig. 4 is a detail section through a portion of the cover or egg holding member;

Fig. 5 is a detail perspective view of an automatic circuit closer which may be employed in connection with the egg tester.

In carrying out my present invention, I employ a casing 1 which is of sheet metal or other opaque material and is provided interiorly with an inverted conical reflector 2 at the center of which is disposed an electric lamp 3 or other illuminating medium. The upper end of the casing 1 is open and is adapted to be closed by the egg holding member of the apparatus which consists of an inclosing wall 4 having a cover or lid 5 hinged to one edge and having an egg supporting member or tray 6 hinged to the opposite edge. The tray 6 is constructed with openings 7, corresponding in number and arrangement with the spaces or cells of an egg filler which is shown at 8 in Fig. 1. This tray is constructed of sheet metal or other opaque material and is preferably slightly dished, as shown at 9, so that it will fit closely within the upper end of the casing 1 and will be adapted to receive and retain a pad of some soft material to fit closely to the eggs and prevent the passage of light around them. The lid 5 may be of any desired material but will preferably be formed of sheet metal to conform to the material in the rest of the apparatus. The wall or body 4 of the egg-containing chamber is provided on two sides with offsets 10 so that when the lid 5 and the wall 4 are turned to rest upon the cover of a crate, space will be provided to accommodate the hands of the operator while supporting the egg filler and the flat and placing the same within the body or wall 4, the lid being provided with notches or recesses 50 adapted to register with the offsets 10 and to accommodate the hands and fingers of the operator. These offsets will preferably be provided on intersecting sides of the wall 4 as such arrangement has been found most convenient, but it will be understood, of course, that they may be disposed on opposite sides of the wall, if preferred. The lid 5 and the tray 6 are each constructed with a spring latch 11 which is adapted to extend into the keeper 12 on the body 4 and each latch is provided with a perforation adapted to receive a pin or tooth 13 formed upon the keeper 12, as shown most clearly in Fig. 4, so that the lid and the tray will be held to the body when the same is being reversed or shifted in transferring the eggs.

One of the offsets 10 will project beyond the wall of the casing 1, but the other offset will not project beyond the side of the casing and to accommodate the same and prevent light reaching the illuminating chamber through said offset, I provide the flange 14 at the upper edge of the adjacent side of the casing and in order that the said flange may not be bent downwardly through rough usage, I provide a standard or partition 15 within the casing which extends up to said flange, as shown clearly in Fig. 3. Upon the casing 1, at diametrically opposite points of the top of the same, I provide guides 16 consisting of standards having vertical slots 17, and trunnions 18 extend from the body 4 through the said slots and are equipped with turning handles or knobs 19 at the outer sides of the said guides. To the trunnions 18, I pivotally attach the upper ends of the upper links 20 of lazy-tongs which have their lower links 21 pivoted to the links or standards 22 pivotally attached to and rising from the bail or U-shaped lever 23 pivoted at its ends to the sides of the casing and projecting forwardly beyond the sides and then across the front of the casing, being provided centrally with a treadle or foot rest 24 whereby it may be depressed.

Upon the flange 14, I secure a circuit closer which may be of any desired type and may conveniently consist of two leaf-springs 25 insulated from each other and connected by the conductors 26 with a battery 27 and the lamp 3. A projection 28, of any convenient form, is provided on the side of the body 4 so that, when the said body is brought down onto the casing 1, said projection will bear upon the upper leaf-spring 25 and force the same against the lower leaf-spring thereby closing the circuit so that the interior of the casing will be illuminated.

It is thought the operation of my device will be readily understood from the foregoing description taken in connection with the accompanying drawings. To place the eggs in the tester, the treadle 24 is depressed so that the link 22 is drawn downwardly and the lower links 21 of the lazy-tongs will be drawn downwardly and the intermediate links 29 swung about their pivot 30 so as to cause the upper ends of the upper links 20 to ride upwardly in the slots 17 thereby carrying the trunnions 18 upwardly and lifting the egg chamber, consisting of the body 4, lid 5, and the tray 6, from the casing. When the said chamber reaches the upper limit of its movement, which is determined by the trunnions 18 coming into contact with the upper ends of the slots 16, the turning knobs 19 are rotated by hand, thereby inverting the egg chamber so that the lid 5 will become the under side of said chamber. If the side or corner of the chamber be then rested upon the egg crate and the latch 11 of the tray 6 released, the said tray may be swung from over the body 4 to expose the interior of the same. A filler and a flat with the eggs supported thereby may then be removed from the crate and placed within the body 4 and rested upon the lid 5, after which the tray is swung over the eggs, as will be readily understood. The turning knobs are then manipulated to restore the egg chamber to its initial position in which the lid 5 will constitute the cover and the lever 23 may then be released. The weight of the egg chamber with its contents will cause the same to at once descend, the rapidity of the descent being governed by the operator retaining pressure upon the lever 23 and preventing the same from jumping rapidly to its uppermost position. As the egg chamber reaches its lowest position on the top of the casing, the circuit is, of course, closed and the interior of the casing illuminated. The latch 11 of the lid 5 is then released and the lid swung from over the eggs, the flat being also lifted therefrom so that the eggs will be illuminated and may be then easily and rapidly examined. After all the eggs have been examined, the flat is replaced over them, the lid 5 is closed, the egg chamber lifted and reversed to permit removal of the eggs and the operation then repeated until the entire stock of eggs on hand has been examined.

It is contemplated to provide tools which will facilitate the removal of the filler and the flat from the egg chamber by engaging the flat and to this end openings 31 are provided in the lid 5 to accommodate such tools.

It will be readily seen that I have provided an exceedingly simple egg testing apparatus which may be operated rapidly without liability to break the eggs and by which a large number of the eggs may be quickly tested.

Having thus described the invention, what is claimed as new is:

1. In an egg tester, the combination of an illuminating chamber, an egg containing chamber adapted to cover the illuminating chamber, guides on the illuminating chamber, members on the egg containing chamber arranged to play in said guides, and means acting upon said members to move the same along the guides and thereby carry the egg containing chamber to or from the illuminating chamber.

2. In an egg tester, the combination of an illuminating chamber, an egg chamber adapted to cover the illuminating chamber, guides rising from the illuminating chamber, members extending from the egg holding chamber and engaging said guides, lazy tongs mounted on the illuminating chamber and connected with said members, and means on the illuminating chamber for actuating said lazy tongs.

3. In an egg tester, the combination of an illuminating chamber, an egg containing chamber comprising a tray having egg-receiving openings, a body to which said tray is hinged and adapted to inclose the eggs, a lid hinged to said body, and means for moving said egg-containing chamber to and from the illuminating chamber.

4. In an egg tester, an egg containing chamber comprising an inclosing body, a cover hinged to said body and adapted to extend over one side of the same, and a tray hinged to the body and adapted to extend over the opposite side of the same, said tray being constructed with egg-receiving openings, and means for holding the cover and the tray normally against the respectively adjacent sides of the body.

5. In an egg tester, the combination of an illuminating chamber, an egg inclosing body having open offsets on some of its sides, a support on the illuminating chamber for one of said offsets, an egg tray hinged to the said inclosing body and adapted to cover one side of the same, and a lid hinged to the inclosing body and adapted to cover the opposite side of the same.

In testimony whereof I affix my signature.

ROBERT W. GILPIN. [L. S.]

Copies of this patent may be obtained for five cents each, by addressing the "Commissioner of Patents, Washington, D. C."